May 13, 1969

E. A. SOKOL 3,443,876

PORTABLE GAS-POWERED APPLIANCE AND A
FUEL STORAGE TANK THEREFOR

Filed Oct. 2, 1967

EDWARD A. SOKOL
INVENTOR

BY *George R. Nimmer*

ATTORNEY

United States Patent Office 3,443,876
Patented May 13, 1969

3,443,876
PORTABLE GAS-POWERED APPLIANCE AND A
FUEL STORAGE TANK THEREFOR
Edward A. Sokol, 3322 S. 122nd St.,
Omaha, Nebr. 68144
Filed Oct. 2, 1967, Ser. No. 672,108
Int. Cl. F21h 1/00; F21l 19/00; F23d 13/24
U.S. Cl. 431—100                                6 Claims

ABSTRACT OF THE DISCLOSURE

This invention relates to a versatile gas-powered portable appliance having as an important component thereof a novel fuel storage tank. In particular this invention relates to a gas-powered appliance that is equally adapted to generate both light and heat energies, said gas-powered appliance having a generous self-contained fuel supply and several other ancillary features whereby said appliance is sufficiently compact and portable to lend itself to camping and general outdoor use.

---

It is the general object of the present invention to provide a versatile gas-powered appliance having a generous self-contained refillable supply of hydrocarbon fuel.

It is a specific object of the present invention to provide a gas-powered portable appliance having sufficient ready portability to lend itself to camping, backyard, and general outdoor use.

It is another object to provide a sturdy and compact portable gas-powered appliance that may be employed to generate radiant energies including selectively within both the visible light spectrum to provide an incandescent lamp and alternatively primarily within the infra-red spectrum to provide a cooking stove.

It is yet another object of the present invention to provide a novel fuel storage tank that is adaptable to store therewithin combustible fuels of various types, said novel storage tank being readily rechargeable e.g. refillable, with fuel and being adapted to supply controlled amounts thereof to an energy generating device such as a lamp or stove.

With the above and other objects and advantages in view, which will become more apparent as the description proceeds, this invention comprises the novel construction, combination, and arrangement of elements hereinafter set forth, and particularly pointed out in the appended claims, and illustrated in the accompanying drawing wherein like numbers refer to like parts in the several views, and in which:

Figure 1:
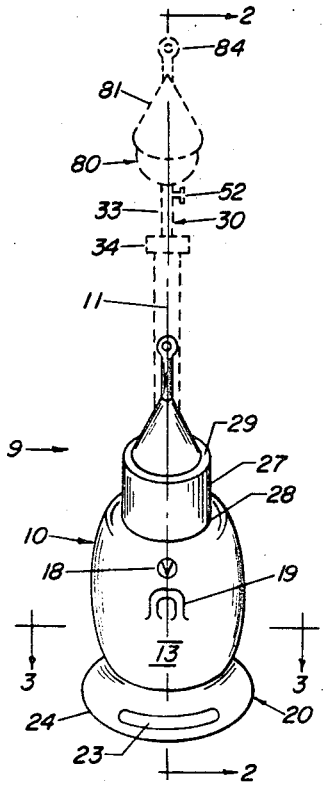
FIGURE 1 is a perspective elevational view of one form of the portable gas-powered appliance of the present invention.

The portable gas-powered appliance 9 comprises a fuel storage tank having an upright longitudinal axis 11 and an internal storage space 17, preferably of annular configuration substantially surrounding a bore 16 of a novel fuel tank 10; regulator means e.g. valve 22, to permit controlled fuel withdrawal from the fuel storage tank; means to maintain said fuel tank in an elevated upright position; an upright pole 30 comprising a plurality of telescoping segments, said multi-segment pole 30 being uprightly supported by the storage tank and preferably positioned within a tank bore 16 and being adapted to reversibly extend and retract along tank upright axis 11; an energy generating device e.g. incandescent lamp 80, stove 90, adapted to generate radiant energy from a controllable flow of combustible fuel, said radiant energy generating device being attached to a terminal segment of upright pole 30; conduit means for supplying a controllable flow of combustible fuel from the regulator means of the fuel storage tank to the energy generating device e.g. 80, 90, said conduit means preferably comprising a lengthy flexible hose 100; and a hose storage compartment preferably including a collector device 25 for storing slack portions of a flexible hose conduit means.

The preferred type fuel for the present invention includes propanes, butanes, and other combustible hydrocarbon gases having an average molecular weight less than about 84, said gaseous fuel being stored at pressures less than about 175–225 p.s.i. Of course, the several walls comprising the fuel storage tank are each structurally impervious to the fuel to be stored within the tank; in the same vane, the several walls are joined together in a fluid-impervious relationship, as by welding. Moreover, the fuel storage tank includes means to permit the introduction of fuel into the internal storage space, means to withdraw controlled amounts of fuel from said storage space, and means to readily transport said tank from one location to another as with integral external handles 19.

A novel storage tank 10 of the present invention comprises an upright longitudinal axis 11, an upright tubular inner wall 12 that surrounds axis 11, and an upright outer wall 13 that surrounds both said inner wall 12 and upright longitudinal axis 11. As can best be seen in FIGURE 3, the transverse limits of the internal fuel storage space 17 of tank 10 are defined by upright walls 12 and 13, and thus, the fuel storage space 17 is of an annular transverse cross-sectional shape. The upright central bore 16 of tank 10 extends through the upper and lower ends of tank 10 whereby the telescopable pole 30 within bore 16 may be extensible upwardly of tank 10 and whereby the conduit means e.g. hose 100, may extend along and downwardly through bore 16 and thence ultimately (as through regulator 22) into annular storage space 17. There are means to uprightly support the fuel storage tank with respect to the earth or similarly substantially horizontal base whereby tank longitudinal axis 11 is upright with respect to said horizontal base. The tank upright supporting means may take several specific forms as exemplified by, but not limited to, a horizontal lower end wall 14 for tank 10, or by means of the hereafter described lower frame element 20.

Figure 3:
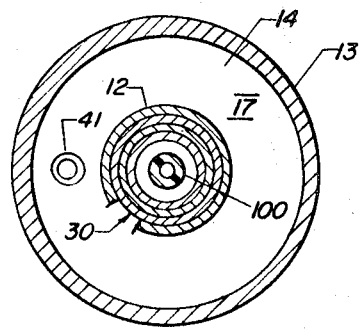
FIGURE 3 is a sectional plan view taken long line 3—3 of FIGURE 1.
Figure 2:
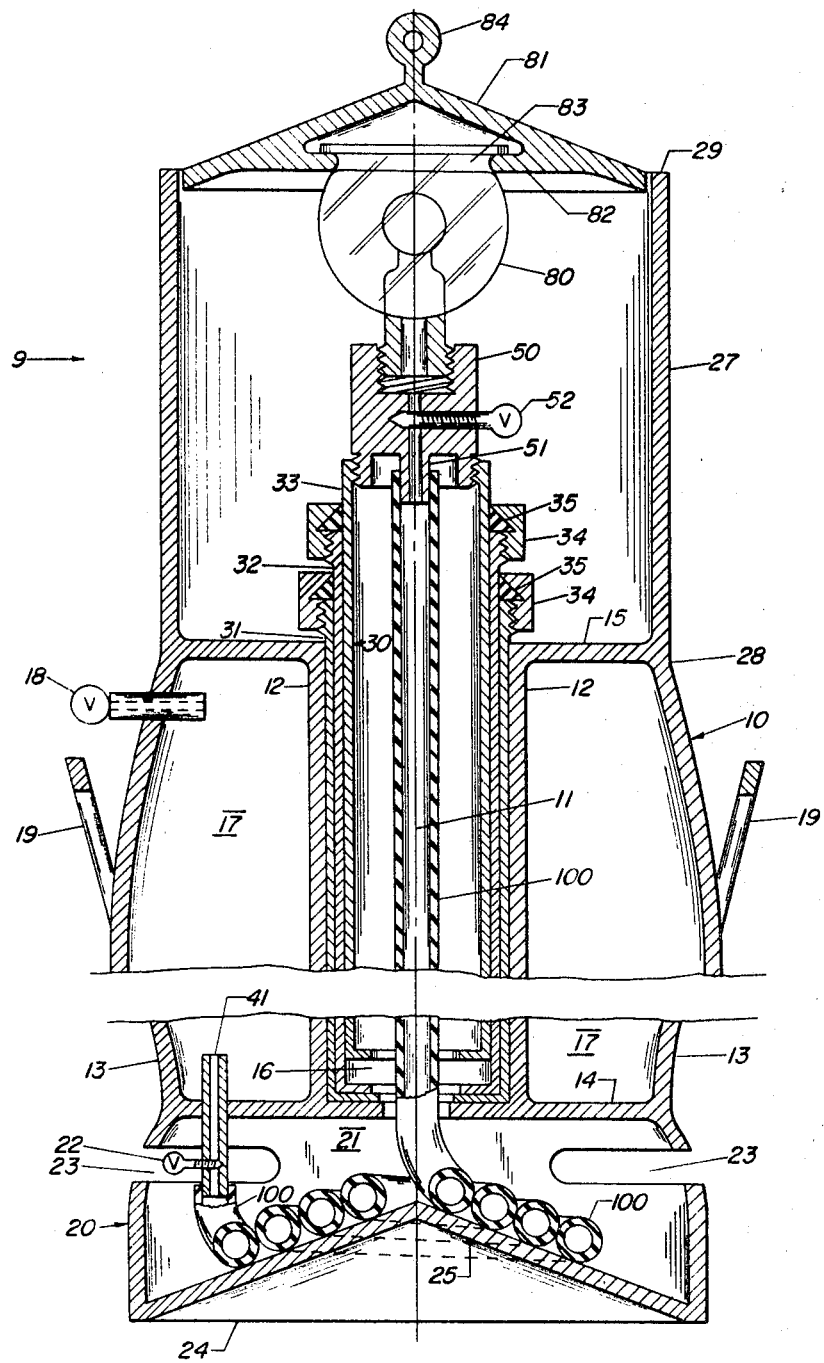
FIGURE 2 is a sectional elevational view taken along line 2—2 of FIGURE 1.

Having generally described the novel fuel storage tank 10 component in the preceding paragraph, the specific tank structure illustrated in FIGURES 1–3 will now be described. Tank 10 comprises a pair of substantially planar end walls including lower end wall 14 and upper end wall 15, each end wall having a central opening surrounding axis 11 and coextensive with the lower and upper terminal, respectively, of upright central bore 16. Upright tubular inner wall 12 is or circular cross-sectional shape and is concentric about axis 11. Lower end wall 14 preferably extends a small distance inwardly of tubular inner wall 12 so as to provide a lower end support for outer segment 31 of upright pole 30. Upright outer wall 13 preferably bulges outwardly at its girth for reasons of structural strength. The several tank walls 12–15 are integrally joined together, as by welding, to provide a fluid-impervious tank structure. Opposed handles 19 are integrally attached to outer wall 13 above its girth, as by welding, to provide a tank portability means. A gas inlet valve 18 pierces outer wall 15, said valve 18 being, for example, of the needle type appropriate to the introduction of hydrocarbon gases having an average molecular weight less than about 84 at a pressure of about 175–225 p.s.i. The regulator means preferably includes a stand pipe 41 piercing lower end wall 14, the upper end of stand pipe 41 being located a finite distance above lower end wall 14 to prevent condensed water within storage space 17 from being introduced into the conduit means 100. The regulator means also includes a valve 22 on stand pipe 41 below tank lower wall 14, said regulator valve 22 being accessibly and conveniently positioned in registry with an elongate aperture 23 of lower frame 20. Of course, inlet valve 18 and regulator valve 22 could be combined into a single physical valve, as by employing conventional fluid-flow attachments; in this way, gaseous fuel could be both introduced and withdrawn through a single fitting.

A lower frame 20 comprises a peripheral skirt having a uniplanar lower circular terminus 24, said skirt being integrally attached to and extending downwardly of tank lower end 14. Thus, the hollow frame 20 serves three functions including: means for uprightly supporting the storage tank whereby the tank longitudinal axis 11 is upright with respect to a substantially horizontal base; means to maintain the storage tank lower end 14 elevated a finite distance above said substantially horizontal base; and the hollow interior 21 of frame 20 providing a storage comartment for slack portions of flexible hose 100.

Figure 5:
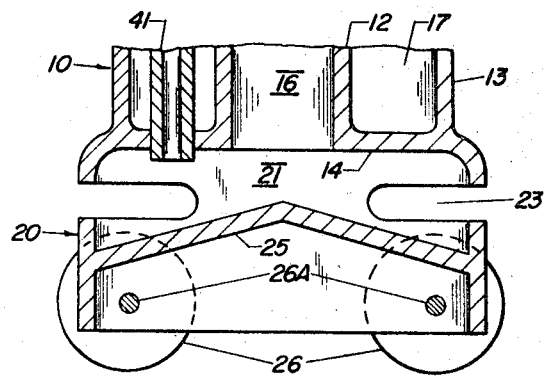
FIGURE 5 is a sectional elevational view of an exemplary form of the means to transport the gas-powered appliance from one location to another.

Because of the upwardly extensible or telescopic nature of the upright multi-segment pole 30, the conduit means disposed between the tank regulatable outlet means e.g. valve 22, and the energy generating device e.g. lamp 80, must substantially exceed the vertical length of tank central bore 16. A flexible hose 100 is preferably employed as the conduit means, the hose length exceeding the combined heights of the tank central bore 16 and the maximum extensible height of pole 30 above tank upper end 15. Accordingly, when pole 30 is employed at an elevation below its maximum extendable height or in its fully retracted form as shown in FIGURE 1, sinuous slack portions of flexible hose 100 are adapted to be stored within the hollow interior 21 of lower frame 20. In order to minimize the possibility of kinking or snarling or tangling within the slack sinuous portions of the flexible hose 100, a conical hose-collector plate 25 may be attached within the hose storage compartment e.g. 21, said hose storage compartment being disposed below upright pole 30. As can be seen in FIGURES 2 and 5, conical hose-collector plate 25 converges toward the lower ends of upright pole 30 and tank central bore 16 whereby the apex of conical plate 25 is positioned a finite distance below tank lower end 14 and upright pole 30. The lower circular extremity of conical plate 25 might be attached, as by welding, to the interior surface of frame 20 above the frame lower end 24. As illustrated in FIGURE 2, slack portions of flexible hose 100 tend to wrap around the upper side of conical plate 25 in spiral fashion.

There is an open-top thin-walled shield 27 attached to the upper end of storage tank 10. Preferably, upright shield 27 is of tubular configuration, the lower end 28 of shield 27 being attached, as by welding, to tank upper end wall 15, while the upper end 29 of shield 27 extends some finite distance above tank upper end 15. Reversibly telescopable upright pole 30 is adapted to extend through and upwardly beyond the open upper end 29 of shield 27, and as alluded to in FIGURES 1 and 2, the height of shield 27 is sufficient to form a protective shield around the normally fragile lamp 80 when pole 30 is fully retracted, as during interim periods of non use for appliance 9.

There are means to facilitate portability of appliance 9, including its fuel tank component 10, from one location to another. Opposed handles 19, attached to fuel tank 10, have already been alluded to. In equivalent manner, handle or grasping means could be attached to the upright shield 27 or to lower frame 20. Moreover, as illustrated in FIGURE 5, the portability means might comprise a plurality of rollable wheels 26 attached as by means of axles 26A revolvably connected to the lower portion of lower frame 20.

Upright pole 30 comprises a plurality of telescopically associated concentric tubular segments, herein as three concentric tubes 31–33, each tube herein having a circular cross-sectional shape. Of course, concentric tubular segments of alternate geometric forms e.g. rectangular, might also be employed. The multi-segment telescoping pole 30 is uprightly positioned within tank central bore 16 whereby said pole 30 is reversibly extensible and retractable along the tank upright axis 11, as indicated in phantom line in FIGURE 1. There are means whereby the tank component uprightly supports the multi-segment pole 30, as for example, the previously described inward extension of tank lower end wall 15 that serves to engage the lower end of outer segment 31. Moreover, there are means to temporarily fix the longitudinal relationship among said tubular segments when the pole 30 is in an upwardly extended form. For example, the inter-segments relationship may be governed by the combination of a collar 34 surrounding and threadedly engaged with the upper extremities of segments 31 and 32, a compressibly resiliently deformable gasket 35 being disposed between collar 34 and the upper end of the threadedly engaged segment. Thus, for example, as collar 34 is threadedly drawn along segment 31 and against gasket 35, said compressible gasket 35 bulges inwardly against adjacent segment 32 to affix the longitudinal relationship between segments 31 and 32 by friction. A similar collar-gasket combination near the upper end of intermediate segment 32 affixes the longitudinal relationship between segments 32 and 33. The frictional engagement among the adjacent segments is released simply by turning collar 34 in the opposite direction i.e. away from compressible gasket 35, whereupon pole 30 is allowed to retract downwardly. In the fully retracted form of pole 30, the collar 34 and transversely extending valve 52 would be disposed above tank upper end 15 within shield 27.

The radiant energy generating device e.g. lamp 80, stove 90, is attached to the conduit means e.g. flexible hose 100, as by means of a longitudinally perforate fitting or adapter 50. Adapter 50 is attached to a terminal segment e.g. 31 or 33, or upright pole 30, as for example, by means of threaded engagement between adapter 50 and the inner side of inner segment 33. Adapter 50 includes a narrowed lower end 51 that is readily frictionally engageable by the upper end of flexible hose 100. A transversely extending valve 52 is adapted to control the amount of fuel flow through the longitudinal perforation of adapter 50. The upper end of the adapter's longitudinal perforation is preferably threaded to permit removable threaded engagement between the radiant energy device e.g. lamp 80, stove 90.

Lamp 80 desirably integrally includes a canopy type protector, as for example, the conical canopy 81 which might include an interior rim 82 adapted to snap-fit within a circumferential groove 83 near the top end of lamp 80. In the retracted condition of pole 30, as shown in FIGURES 1 and 2, the canopy 81 would act as a cover for the open top of shield 27 and thus serve to further protect the fragile glass envelope of lamp 80. Extending upwardly of canopy 81 is a perforate ring 84, by manual grasp thereof an operator might upwardly extend pole 30 to the desired height.

Figure 4:
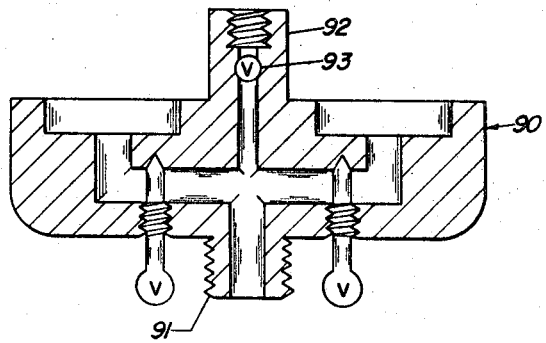
FIGURE 4 is a sectional elevational view of a radiant energy generating device component, specifically as a heating stove, which may be employed as a component of the present invention.

An alternate type radiant energy device is the dual burner stove 90 shown in FIGURE 4. Burner 90 includes a threaded nipple 91 by which burner 90 might be removably attached to adapter 50 in analogous fashion as with lamp 80. Stove 90 includes a branched internal passageway for the fuel, one branch leading to each burner. Appropriate valves regulate the amount of fuel permitted to flow to each burner station. Dual-burner stove 90 might optionally include an upwardly-extending nipple 92, and a tertiary branch internal fuel passageway including valve means 93 along said nipple 92. The lamp assembly 80 might be threadedly engaged with said optional nipple 92 whereby the device 90 would generate both heat and light energies.

From the foregoing, the construction and operation of the portable gas-powered appliance will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. A portable gas-powered appliance adapted to generate radiant energy from a controlled flow of combustible hydrocarbon gas said portable gas-powered appliance comprising: a fluid storage tank adapted to store said combustible hydrocarbon gas therein, said storage tank including an upper end, a lower end, an upright longitudinal axis, and an outer wall surrounding said upright longitudinal axis; means to uprightly support the storage tank with respect to a substantially horizontal base whereby the tank longitudinal axis is upright with respect to said horizontal base; means to transport the gas storage tank from one location to another; regulator means to permit controlled fuel withdrawal from the tank; an upright pole uprightly supported by said storage tank, said upright pole comprising a plurality of concentric tubular segments associated in telescoping relationship along the tank longitudinal axis whereby said upright pole is reversibly extensible and retractable along the tank longitudinal axis, said upright pole including means to temporarily fix the longitudinal relationship among said tubular segments; a hollow frame disposed below said upright pole and attached to said gas tank whereby said frame hollow interior provides a hose storage compartment; a device adapted to generate radiant energy from a controllable source of hydrocarbon gas, said radiant energy generating device being attached to said upright telescoping pole; and conduit means for supplying a controllable flow of combustible hydrocarbon gas from said storage tank regulator means to the radiant energy generating device, said conduit means including a flexible hose extending downwardly into the hose storage compartment when the upright telescoping pole is in its fully retracted position.

2. The portable gas-powered appliance of claim 1 wherein the means for temporarily fixing the longitudinal relationship among the tubular segments of said upright telescopable pole includes a collar surrounding and threadedly engaged with the upper portion of a tubular segment and a compressibly deformable gasket disposed between said collar and the upper end of said tubular segment; wherein said radiant energy generating device comprises an internal passageway having at least two branches for the passage therethrough of a hydrocarbon gas, one of said branches terminating at a heat generating device and another of said branches terminating at a light generating device; and wherein a conical hose collector device is disposed below said telescopable pole, the said conical hose collector plate converging upwardly toward the lower end of said telescopable pole.

3. A portable gas-powered appliance adapted to generate radiant energy from a controllable flow of combustible hydrocarbon gas, said portable gas-powered appliance comprising:

(A) A fluid storage tank adapted to store said combustible hydrocarbon gas fuel therein, said storage tank including: an upper end, a lower end, an upright tubular inner wall surrounding an upright longitudinal axis, and an outer wall surrounding both said inner wall and said upright longitudinal axis, each of said walls being impervious to said combustible gas and said walls being integrally joined together to provide a hollow storage tank adapted to store said combustible gas therewithin, said storage tank including an upright central bore along said upright longitudinal axis and extending through both said upper and lower end, said upright inner wall intersecting the upper end wall, said inner and outer walls providing for the tank an annular storage space for combustible gas, said annular storage space being disposed between said inner and outer walls;
(B) Means to uprightly support the storage tank with respect to a substantially horizontal base whereby the tank longitudinal axis is upright with respect to said horizontal base;
(C) Means to transport the portable gas-powered appliance from one location to another;
(D) Means to maintain the storage tank lower end elevated a finite distance above the horizontal base;
(E) Regulator means to permit controllable fuel withdrawal from the tank;
(F) An upright pole uprightly supported by said storage tank, said upright pole being positioned within the upright central bore of the storage tank, said upright pole comprising a plurality of concentric tubular segments associated in telescoping relationship along the tank longitudinal axis whereby said upright pole is reversibly extensible and retractable along the tank longitudinal axis, said upright pole including means to temporarily fix the longitudinal relationship among said tubular segments;
(G) A device adapted to generate radiant energy from a controllable flow of combustible hydrocarbon gas, said radiant energy generating device being attached to a terminal segment of said telescoping pole; and
(H) Conduit means for supplying a controllable flow of combustible hydrocarbon gas from within said gas storage tank regulator means to the radiant energy generating device.

4. The portable gas-powered appliance of claim 3 wherein the tank elevation means comprises a hollow frame disposed beneath the gas tank whereby the frame hollow interior also provides a hose storage compartment; wherein there is a protective shield extending upwardly from and attached to the gas tank and substantially surrounding the tank longitudinal axis, said protective shield having an upper end opening that overlies the upper terminus of the tank central bore; wherein the conduit means for supplying a controllable flow of combustible gas from the regulator means to the radiant energy generating device includes a flexible hose communicating with the generating device, the said flexible hose extending along the entire length of the tank central bore and exceeding the length of said tank bore; and wherein the hose storage compartment includes means to store slack portions of the flexible hose.

5. The portable gas-powered appliance of claim 4 wherein the means for temporarily fixing the longitudinal relationship among the tubular segments of said upright telescopable pole includes a collar surrounding and threadedly engaged with the upper portion of a tubular segment and a compressibly resiliently deformable gasket disposed between said collar and the uper end of the tubular segment; and wherein a conical hose collector device is disposed within the hose storage compartment below said telescopable pole, the said conical hose collector plate converging upwardly toward the lower end of said telescopable pole.

6. The portable gas-powered appliance of claim 5 wherein the radiant energy generating device comprises a light generating lamp having a canopy cover attached to said lamp, the said light generating lamp being disposed within the protective shield when the telescopic pole is downwardly retracted; and wherein the means for transporting said gas-powered appliance comprises a plurality of rollable wheels attached to the said frame member and extending below the lower terminus of said frame member.

References Cited

UNITED STATES PATENTS

| | | | |
|---|---|---|---|
| 667,225 | 2/1901 | Kitson | 431—344 |
| 3,140,740 | 7/1964 | Lagreid | 431—110 X |

EDWARD J. MICHAEL, *Primary Examiner.*

U.S. Cl. X.R.

431—156, 253, 343